(12) United States Patent
Kumazawa et al.

(10) Patent No.: US 12,742,757 B2
(45) Date of Patent: Sep. 22, 2026

(54) REDUCING MEMBER, ANALYSIS DEVICE, AND ANALYSIS METHOD

(71) Applicant: BL TEC K.K., Osaka (JP)

(72) Inventors: Yorihiro Kumazawa, Tokyo (JP); Miho Ohta, Tokyo (JP); Takashi Nishimura, Tokyo (JP)

(73) Assignee: BL TEC K.K., Osaka (JP)

( * ) Notice: Subject to any disclaimer, the term of this patent is extended or adjusted under 35 U.S.C. 154(b) by 0 days.

(21) Appl. No.: 18/692,649

(22) PCT Filed: Mar. 30, 2022

(86) PCT No.: PCT/JP2022/015922
§ 371 (c)(1),
(2) Date: Mar. 15, 2024

(87) PCT Pub. No.: WO2023/188091
PCT Pub. Date: Oct. 5, 2023

(65) Prior Publication Data

US 2024/0377372 A1 Nov. 14, 2024

(51) Int. Cl.
*G01N 31/22* (2006.01)
*G01N 30/02* (2006.01)
*G01N 31/20* (2006.01)

(52) U.S. Cl.
CPC ............. *G01N 31/22* (2013.01); *G01N 30/02* (2013.01); *G01N 31/20* (2013.01); *G01N 2030/027* (2013.01)

(58) Field of Classification Search
CPC ........ G01N 31/22; G01N 30/02; G01N 31/20; G01N 2030/027
See application file for complete search history.

(56) References Cited

U.S. PATENT DOCUMENTS 5,580,523 A 12/1996 Bard
2008/0277275 A1 11/2008 Kubo
(Continued)

FOREIGN PATENT DOCUMENTS

CN 101613377 A * 12/2009
CN 101655501 A 2/2010
(Continued)

OTHER PUBLICATIONS

Allowance for JP Patent Application No. JP2022-530790, dated Nov. 21, 2023, 3 pages.
(Continued)

*Primary Examiner* — Melvin C. Mayes
*Assistant Examiner* — Sophia Y Lyle
(74) *Attorney, Agent, or Firm* — Casimir Jones, S.C.; Robert A. Goetz

(57) ABSTRACT

Provided is an analysis device and an analysis method which, while solving the problem of column plugging, carries out continuous analysis of nitrogen in a sample without use of cadmium that causes environmental pollution. The problem is solved by an analysis method including: a sample introduction step of introducing a sample into a tube; a reduction step of reducing, to ammonium ions, nitrate ions and nitrite ions in the sample being transferred in the tube; and an analysis step of analyzing the ammonium ions in the sample which have been generated in the reduction step. In the reduction step, the nitrate ions and the nitrite ions in the sample are reduced by transferring the sample in a hollow tube in which at least an inner wall surface is made of zinc.

8 Claims, 5 Drawing Sheets

(a)

(b)

(56) References Cited

U.S. PATENT DOCUMENTS

| | | | | |
|---|---|---|---|---|
| 2008/0293042 | A1 | 11/2008 | Cooper | |
| 2009/0117664 | A1 | 5/2009 | Shinoda | |
| 2010/0040910 | A1 | 2/2010 | Kajino et al. | |
| 2011/0168882 | A1 * | 7/2011 | Hoyes | H01J 49/42 250/281 |
| 2013/0283875 | A1 | 10/2013 | Jin et al. | |
| 2017/0157659 | A1 | 6/2017 | Jin et al. | |
| 2019/0299115 | A1 | 10/2019 | Lopa | |
| 2021/0318278 | A1 | 10/2021 | Nagaoka et al. | |

FOREIGN PATENT DOCUMENTS

| | | | | | |
|---|---|---|---|---|---|
| CN | 202126251 | U | | 1/2012 | |
| CN | 207366522 | U | | 5/2018 | |
| CN | 208952709 | U | * | 6/2019 | |
| EP | 1182249 | B1 | * | 1/2007 | C10L 3/06 |
| GB | 2189597 | A | * | 10/1987 | G01N 21/85 |
| JP | 58217681 | A | * | 12/1983 | F16L 58/00 |
| JP | 60-018745 | | | 5/1985 | |
| JP | 60-190568 | | | 9/1985 | |
| JP | 2001-194357 | | | 7/2001 | |
| JP | 2003-090836 | A | | 3/2003 | |
| JP | 2003-290630 | | | 10/2003 | |
| JP | 2005-164289 | | | 6/2005 | |
| JP | 2008-064514 | | | 3/2008 | |
| JP | 2008-164589 | | | 7/2008 | |
| JP | 2009-115758 | | | 5/2009 | |
| JP | 2009-133818 | A | | 6/2009 | |
| JP | 6018745 | B2 | | 11/2016 | |
| JP | 2019-100804 | | | 6/2019 | |
| KR | 2015-0003490 | | | 1/2015 | |
| KR | 2021-0143502 | A | | 11/2021 | |

OTHER PUBLICATIONS

Office Action for JP Patent Application No. JP2022-530790, dated Jun. 6, 2023, 3 pages.
Hiroshi Namiki et al., “Spectrophotometric determination of nitrate ion and total nitrogen in water using Cu—Zn column”, Department of Applied Chemistry, Faculty of Engineering, Kogakuin University, 1997, vol. 46, No. 4, pp. 271-274.
Masakichi Nishimura et al., “Determination of nitrate by reduction to nitrite”, Department of Chemistry, Hokkaido University, 1969, vol. 18, pp. 154-158.
International Search Report for PCT/JP2022/015922 and its English Translation, dated Jun. 21, 2022, 6 pages.
Allowance for JP Patent Application No. 2023-209603 dated Jun. 25, 2024, 3 pages.
Office Action for CN Patent Application No. 202280063186.8, dated Dec. 11, 2024, 10 pages.
Office Action for CN Patent Application No. 202280063186.8, dated Aug. 28, 2024, 8 pages.
Zhang Xinhua et al., “Research on Nitrite Production in Water Supply Pipes”, Building Technology Communication (Water Supply and Drainage, Issue 05, dated Dec. 31, 1984, pp. 25-27.
Office Action for KR Patent Application No. 10-2024-7008229, dated Aug. 29, 2024, 4 pages.
European Search Report for 22935237.2, dated Jul. 31, 2025, 11 pages.
Rho Tae Keun et al: “Practical considerations for the segmented-flow analysis of nitrate and ammonium in seawater and the avoidance of matrix effects”, Ocean Science Journal, vol. 50, No. 4, Jan. 6, 2016, pp. 709-720, XP035720340.

* cited by examiner (a) (b)

REDUCING MEMBER, ANALYSIS DEVICE, AND ANALYSIS METHOD

TECHNICAL FIELD

The present invention relates to a reducing member, an analysis device, and an analysis method.

BACKGROUND ART

Conventionally, a copper-cadmium reduction method has been employed for measurement of total nitrogen in seawater and brackish water. However, in the copper-cadmium reduction method, from the viewpoint of environmental pollution, there have been, for example, the following problems: cadmium is mixed in waste water after analysis; and it is necessary to dispose of a copper-cadmium column as a waste subject to special control.

As a measurement method for solving such problems, disclosed is a method of measuring nitrogen dissolved in seawater. According to this method, in a column which is charged with zinc particles coated with copper, nitrate ions and nitrite ions dissolved in seawater are reduced to ammonium ions, and then, the quantity of the aforesaid ammonium ions and ammonium ions originally dissolved in the seawater is determined.

CITATION LIST

Patent Literature

[Patent Literature 1]
Japanese Patent Application Publication, Tokukai, No. 2009-115758

SUMMARY OF INVENTION

Technical Problem

A conventional technique disclosed in Patent Literature 1 solves the problem of an environmental load since cadmium is not used in this technique. However, the conventional technique has a problem in that since the column which is charged with the zinc particles coated with copper is used for reduction of nitrate ions and nitrite ions, column plugging is caused by, for example, a suspended substance in a sample.

As possible measures for preventing such plugging, filtering the sample, setting a guard column preceding the column, and the like can be considered. However, in the cases of such measures, a suspended substance is removed, and thus, in the case of a method in which nitrogen in a seawater sample is directly analyzed as dissolved inorganic nitrogen (DIN) as in Patent Literature 1, it becomes impossible to accurately measure the total amount of nitrate ions, nitrite ions and ammonium ions including those ions in the suspended substance in the sample.

An object of an aspect of the present invention is to provide an analysis device and an analysis method each of which, while solving the problem of column plugging, carries out continuous analysis of nitrogen in a sample without use of cadmium that causes environmental pollution.

Solution to Problem

As a result of diligent studies for solving the above problem, the inventors of the present invention found that with use of a novel reducing member which has not been existed conventionally, the above object can be achieved.

That is, aspects of the present invention include the following features.

<1> A reducing member being a hollow tube in which at least an inner wall surface is made of zinc and in which a sample is transferred.

<2> An analysis device including: a sample introducing part which is for introducing a sample into a tube; a reducing part which is for reducing, to ammonium ions, nitrate ions and nitrite ions in the sample being transferred in the tube; and an analyzing part which is for analyzing the ammonium ions in the sample, the ammonium ions having been generated in the reducing part, the reducing part including a reducing member recited in <1>.

<3> An analysis method including: a sample introduction step of introducing a sample into a tube; a reduction step of reducing, to ammonium ions, nitrate ions and nitrite ions in the sample being transferred in the tube; and an analysis step of analyzing the ammonium ions in the sample which have been generated in the reduction step, in the reduction step, the nitrate ions and the nitrite ions in the sample being reduced by transferring the sample in a hollow tube in which at least an inner wall surface is made of zinc.

Advantageous Effects of Invention

According to an aspect of the present invention, it is possible to provide an analysis device and an analysis method each of which, while solving the problem of column plugging, carries out continuous analysis of nitrogen in a sample without use of cadmium that causes environmental pollution.

DESCRIPTION OF EMBODIMENTS

Figure 1:
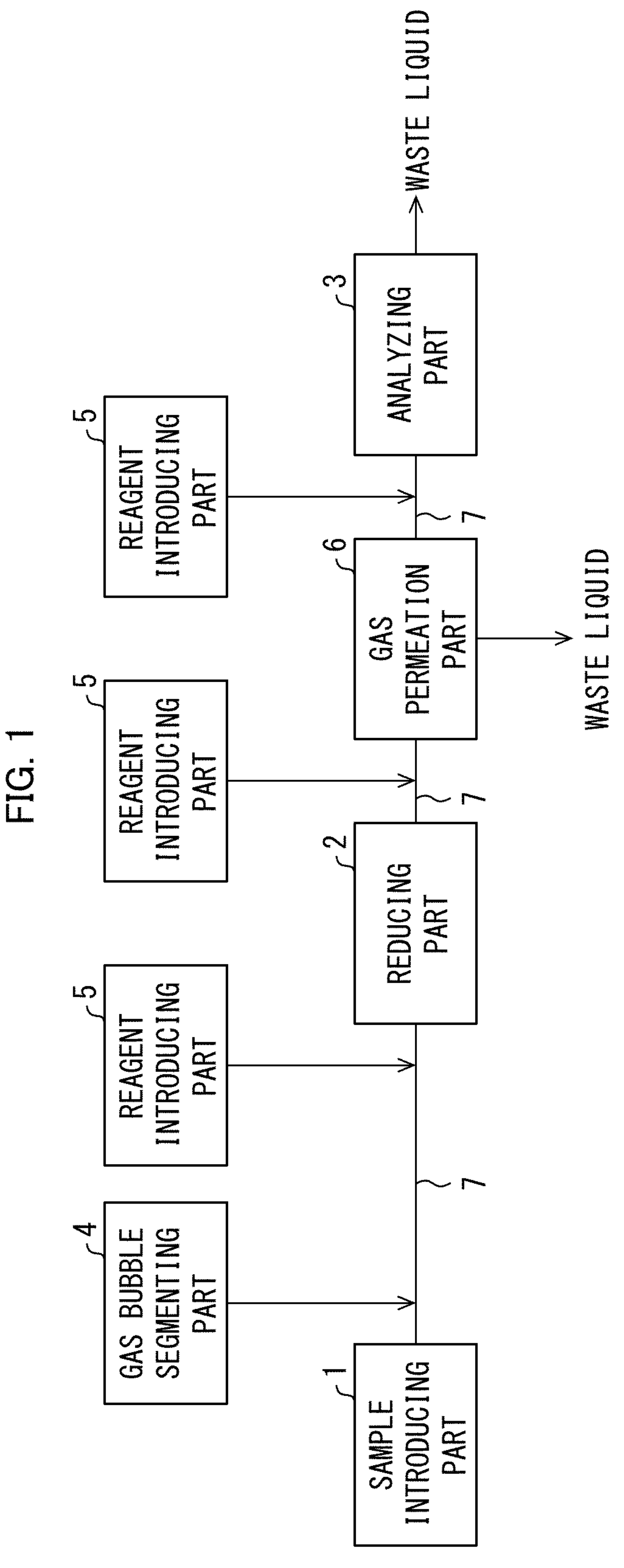
FIG. 1 is a drawing schematically illustrating a configuration of an analysis device in accordance with an embodiment of the present invention.

The following description will discuss embodiments of the present invention in detail. Note, however, that the present invention is not limited to the embodiments, and can be altered within the scope of the matters described herein. The present invention also encompasses, in its technical scope, any embodiment derived by combining, as appropriate, technical means disclosed in differing embodiments. Note that all academic and patent literatures cited in the present specification are incorporated herein by reference. Further, any numerical range expressed as "A to B" in the present specification means "not less than A and not more than B (i.e., a range from A to B which includes both A and B)" unless otherwise specified in the present specification.

<1> Reducing Member

A reducing member in accordance with an embodiment of the present invention is a hollow tube in which at least an inner wall surface is made of zinc and in which a sample is transferred. With this configuration, the reducing member in accordance with an embodiment of the present invention can transfer a sample in the tube and at the same time, reduce, to ammonium ions, nitrate ions and nitrite ions that may be contained in the sample being transferred in the tube. According to such a reducing member, there is no problem of plugging that occurs in a conventionally used column which is charged with zinc particles coated with copper. Further, the sample in which a suspended substance is contained can be transferred and the nitrate ions and the nitrite ions in the sample can be reduced. Therefore, it is possible to accurately analyze the total amount of the nitrate ions, the nitrite ions and ammonium ions contained in the sample.

Here, in the present specification, to "reduce, to ammonium ions, nitrate ions and nitrite ions that may be contained in a sample" and "reducing, to ammonium ions, nitrate ions and nitrite ions in a sample" means reducing, to ammonium ions, at least nitrate ions and/or nitrite ions in a case where the nitrate ions and/or the nitrite ions are contained in a sample.

The tube of the reducing member in accordance with an embodiment of the present invention has an inner diameter of preferably 0.5 mm to 1.5 mm, more preferably 0.6 mm to 1.4 mm, further more preferably 0.7 mm to 1.3 mm, particularly preferably 0.8 mm to 1.2 mm, and most preferably 0.9 mm to 1.1 mm, but the inner diameter is not limited to these. In a case where the inner diameter is not less than 0.5 mm, it is possible to transfer the sample into the tube at a moderate rate. On the other hand, in a case where the inner diameter of the tube is not more than 1.5 mm, the sample that is being transferred inside the tube is more frequently brought into contact with a wall of the tube, so that it is possible to sufficiently reduce nitrate ions and nitrite ions in a sample. Therefore, such an inner diameter is preferable.

The tube of the reducing member in accordance with an embodiment of the present invention has an wall thickness of preferably 0.1 mm to 1.5 mm, more preferably 0.2 mm to 1.0 mm, further more preferably 0.3 mm to 0.7 mm, and most preferably 0.4 mm to 0.6 mm, but the wall thickness is not limited to these. In a case where the wall thickness is not less than 0.1 mm, the strength of the reducing member is sufficient. Therefore, a wall thickness of not less than 0.1 mm is preferable. On the other hand, in a case where the wall thickness is not more than 1.5 mm, processing into a desired shape is possible. Therefore, a wall thickness of not more than 1.5 mm is preferable.

The tube of the reducing member in accordance with an embodiment of the present invention has a length of preferably 100 mm to 1000 mm, more preferably 200 mm to 900 mm, further more preferably 300 mm to 800 mm, and most preferably 400 mm to 700 mm, but the length is not limited to these. In a case where the length of the tube is not less than 100 mm, a sample that is being transferred inside the tube is more frequently brought into contact with the wall of the tube, so that it is possible to sufficiently reduce nitrate ions and nitrite ions in the sample. Therefore, a length of not less than 100 mm is preferable. Further, in a case where the length is not more than 1000 mm, the time taken for transferring the sample is not too long and therefore, the time needed for analysis can be shortened.

The tube of the reducing member in accordance with an embodiment of the present invention has a cross-sectional shape that is typically round, but that may be oval or polygonal.

Figure 8:
FIG. 8 is a diagram schematically illustrating an example of a reducing member.
Figure 8:
Figure 8:
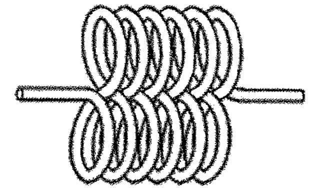

The shape of the tube of the reducing member in accordance with an embodiment of the present invention is not limited to any particular one, and may be linear or curved. Among others, the shape is more preferably curved, and further more preferably a shape composed of a curve which, drawing a figure such as a circle, moves in a direction perpendicular to a drawing plane. Such a figure is not limited to any particular one, and can be, for example, a circle, an oval, or a figure of eight. Then, the shape of the tube can be, for example, a helix shape or a figure-eight helix shape. FIG. 8 schematically illustrates examples of the reducing member. FIG. 8(*a*) shows a helix-shaped reducing member, and FIG. 8(*b*) shows an figure-eight helix-shaped reducing member. According to such a shape, since the sample that is being transferred in the tube is transferred while circling, the sample is uniformly mixed and more frequently comes in contact with the wall of the tube. Therefore, since the nitrate ions and the nitrite ions in the sample can be sufficiently reduced, such a shape is preferable. The number of helix turns of, for example, the helix shape or the figure-eight helix shape is not limited to any particular number. The number of turns is, for example, 1 turn to 20 turns, more preferably 2 turns to 10 turns, and further more preferably 4 turns to 7 turns. In a case where the number of turns is not less than 1 turn, the sample is more uniformly mixed, and at the same time, the sample more frequency comes into contact with the wall of the tube. Therefore, not less than 1 turn is preferable. Further, in a case where the number of turns is not more than 20 turns, it is possible to make a device compact. Therefore, not more than 20 turns is preferable.

In a case where the shape of the tube is, for example, a helix shape, the helix shape has an outer diameter (referred to as "coil diameter") of, for example, 10 mm to 70 mm, more preferably 15 mm to 60 mm, further more preferably 20 mm to 50 mm, and most preferably 25 mm to 40 mm, but the outer diameter is not limited to these. In a case where the coil diameter is not less than 10 mm, it is possible to stably transfer liquid. Therefore, a coil diameter of not less than 10 mm is preferable. Further, in a case where the coil diameter is not more than 70 mm, the liquid can be mixed more properly. Therefore, a coil diameter of not more than 70 mm is preferable.

In a case where the shape of the tube is, for example, a helix shape, the shape has a coil pitch of, for example, 0.7 mm to 40 mm, more preferably 0.8 mm to 30 mm, and further more preferably 0.9 mm to 25 mm, but the coil pitch is not limited to these. In a case where the coil pitch is not less than 0.7 mm, it is possible to form the reducing member which is obtained by winding a tube which has a preferable tube diameter. Therefore, a coil pitch of not less than 0.7 mm is preferable. Further, in a case where the coil diameter is not more than 40 mm, the reducing member has a size with which the reducing member does not take up much space. Therefore, a coil diameter of not more than 40 mm is preferable. Further, in a case where the tube has, for example, a helix shape, the tube can be wound without a gap between adjacent portions of the tube. Even in such a case, the coil pitch is not limited to any particular one, and is, for example, 0.7 mm to 5.0 mm, more preferably 1.0 mm to 4.5 mm, and further more preferably 1.2 mm to 4.0 mm.

In a case where the tube has, for example, a figure-eight helix shape, the maximum length of the figure-eight shape of the figure-eight helix shape is similar to the coil diameter in the case of the helix shape, and the pitch of the figure-eight helix shape is similar to the coil pitch in the case of the helix shape.

The tube of the reducing member in accordance with an embodiment of the present invention may be a tube in which at least an inner wall surface is made of zinc. According to the configuration, zinc can function as a reducing agent and reduce nitrate ions and nitrite ions to ammonium ions. Further, by using zinc, it becomes possible to use no cadmium, solving the problem of an environmental load. It is more preferable that the tube of the reducing member be entirely made of zinc, in view of safety of a metal used, ease of production, and possibility of long-term use as the reducing agent.

In an embodiment of the present invention, the zinc which forms the tube or the inner wall surface of the tube is more preferably coated with copper at least on an inner side of the tube. By coating the inner side of the tube with copper, it is possible to increase a rate of reduction of the nitrate ions and the nitrite ions to ammonium ions. The thickness of copper coating is not limited to any particular one, and is, for example, 0.5 μm to 300 μm and more preferably 10 μm to 200 μm. In a case where the thickness of the copper coating is not less than 0.5 μm, it is possible to increase the rate of reduction of the nitrate ions and the nitrite ions to ammonium ions for a long time. Therefore, the thickness of not less than 0.5 μm is preferable. Further, in a case where the thickness of the copper coating is not more than 300 μm, the inner diameter of the tube is not too small. Therefore, the thickness of not more than 300 μm is preferable. A method of coating, with copper, the zinc forming the tube is not limited to any particular one. Examples of the method include a method in which the hollow tube in which at least the inner wall surface is made of zinc is immersed in a copper sulfate aqueous solution containing a chelating agent such as ethylenediaminetetraacetic acid (EDTA). In the method, the content of the chelating agent relative to the total weight of the copper sulfate aqueous solution is preferably 1% by weight to 10% by weight. Further, the content of the copper sulfate relative to the total weight of the copper sulfate aqueous solution is preferably 0.5% by weight to 5% by weight. The copper sulfate aqueous solution in which the tube is immersed has a pH of preferably 6 to 8, and an immersion time is preferably 12 hours to 24 hours. Alternatively, the zinc which forms the inner wall surface of the tube or the tube may be coated with copper by a method in which the copper sulfate aqueous solution is caused to flow in the hollow tube in which at least the inner wall surface is made of zinc or by causing the copper sulfate aqueous solution to remain in the hollow tube.

<2> Analysis Device

An analysis device in accordance with an embodiment of the present invention, includes: a sample introducing part which is for introducing a sample into a tube; a reducing part which is for reducing, to ammonium ions, nitrate ions and nitrite ions in the sample being transferred in the tube; and an analyzing part which is for analyzing the ammonium ions in the sample, the ammonium ions having been generated in the reducing part, the reducing part including a reducing member in accordance with an embodiment of the present invention described above.

The analysis device makes it possible to carry out continuous analysis of nitrogen and the like (total amount of nitric acid, nitrous acid, and ammonia) in a sample (e.g., a sample of seawater or a sample from brackish water area) without use of cadmium that causes environmental pollution, while solving the problem of column plugging.

In an embodiment of the present invention, the analysis device can be a flow analyzer. According to the flow analyzer, it is possible to continuously introduce the sample into the tube, carry out reduction in the tube, introduce a reagent into the tube, cause a reaction, and then, continuously acquire analysis data in the analyzing part.

<2.1> Embodiment 1

An embodiment of the present invention will be described with reference to the drawings. FIG. 1 is a drawing schematically illustrating a configuration of a flow analyzer in accordance with Embodiment 1 of the present invention.

The flow analyzer in accordance with Embodiment 1 of the present invention, includes: a sample introducing part 1 which is for introducing a sample into a tube 7; a gas bubble segmenting part 4 which is for producing, in the tube 7, a plurality of segments that are separated by gas bubbles, by carrying out gas bubble segmentation with respect to the sample that has been introduced into the tube 7; a reagent introducing part 5 which is for adding a reagent into a flow of the sample being transferred inside the tube 7; a reducing part 2 which is for reducing, to ammonium ions, nitrate ions and nitrite ions in the sample being transferred in the tube 7; another reagent introducing part 5 which is for adding a reagent into a flow of the sample that has passed through the reducing part 2 and contains ammonium ions and that is being transferred in the tube 7; a gas permeation part 6; another reagent introducing part 5 which is for adding a reagent into a flow of the sample that has passed through the gas permeation part 6 and contains ammonium ions, and that is being transferred in the tube 7; and an analyzing part 3 which is for analyzing the ammonium ions in the sample.

The sample introducing part 1 is a device for sampling a sample and introducing the sample into the tube 7. In an embodiment of the present invention, the sample introducing part 1 includes a thief tube through which the sample is led to the tube 7 and a sampling pump which imparts a suction force to the thief tube. By the sampling pump, the sample is introduced into the tube 7 at a given flow rate. The sample is a liquid containing a substance or an element each of which is an analysis target.

The gas bubble segmenting part 4 is a device for producing, in the tube 7, a plurality of segments that are separated by gas bubbles, by carrying out gas bubble segmentation with respect to the sample that has been introduced into the tube 7. In an embodiment of the present invention, the gas bubble segmenting part 4 includes a gas introduction tube through which gas is led to the tube 7 and a gas introduction pump which imparts a suction force to the gas introduction tube. By carrying out the gas bubble segmentation, it is possible to suitably mix the reagent and the like, due to a turbulent flow in a segmented liquid which is divided by the gas bubbles. At the same time, in the reducing part 2, the sample that is being transferred inside the tube is more frequently brought into contact with the wall of the tube of the reducing part 2, so that it is possible to sufficiently reduce the nitrate ions and the nitrite ions in the sample to ammonium ions. Since the segmented liquid is divided by the gas bubbles and independently flows in the tube 7, it is possible to prevent diffusion between samples. A method of, in this manner, introducing a reagent into a continuous flow of the sample in the tube which sample is segmented by gas bubbles, carrying out a reaction operation, and then carrying out an analysis with use of a detector which is provided downstream is referred to as a continuous flow analysis method (CFA). Examples of the gas for the gas bubble segmentation can include: inert gases such as argon and helium; and various gases such as nitrogen. Each of these gases may be used solely or two or more of these gases may be used in combination. Among others, the gas is more preferably nitrogen and/or an inert gas(es) such as argon and/or helium. In a case where the gas is nitrogen and/or an inert gas(es) such as argon and/or helium, no oxygen is contained in the gas. This can prevent oxidation of the wall of the tube of the reducing part 2 due to oxygen. Therefore, such a gas can make it possible to maintain a high rate of reduction of the nitrate ions and the nitrite ions to ammonium ions, and is preferable.

The reagent introducing part 5 is a device for adding a reagent into a flow of the sample being transferred inside the tube 7. The reagent introducing part 5 includes a reagent introduction tube through which the reagent is led to the tube 7 and a reagent introduction pump which imparts a suction force to the reagent introduction tube. Examples of the reagent to be added by the reagent introducing part 5 which is provided downstream of the gas bubble segmenting part 4 and upstream of the reducing part 2 include chelating agents such as EDTA, citric acid, and trans-1,2-cyclohexanediaminetetraacetic acid-hydrate (CyDTA). In a case where on the upstream of the reducing part 2, the above chelating agent is added and, in the reducing member 2 in a subsequent stage, zinc ions or copper ions are eluted into the sample from the reducing member, the chelating agent forms a stable complex with those ions having been eluted. This makes it possible to reduce the concentration of free zinc ions or copper ions. Therefore, it is possible to efficiently reduce the nitrate ions and the nitrite ions to ammonium ions, by reducing a potential between zinc ions and zinc or between copper ions and copper. In the example illustrated in FIG. 1, the reagent introducing part 5 is provided downstream of the gas bubble segmenting part 4 and upstream of the reducing part 2. However, the reagent introducing part 5 may be provided downstream of the sample introducing part 1 and upstream of the gas bubble segmenting part 4.

The reducing part 2 is a device which is for reducing, to ammonium ions, the nitrate ions and the nitrite ions in the sample being transferred in the tube 7. The reducing part 2 includes the reducing member in accordance with an embodiment of the present invention, and the sample is transferred in the tube of the reducing member. The tube 7 is connected to both ends of the tube of the reducing member of the reducing part 2. Then, the sample that is being transferred in the tube 7 is, as it is, continuously transferred inside the tube of the reducing member. This is followed by continuous transfer, in the tube 7, of the sample which has passed through the tube of the reducing member. In other words, the tube of the reducing member of the reducing part 2 serves as the tube 7. The tube 7 and each of the both ends of the tube of the reducing member of the reducing part 2 are connected to each other such that the sample and the gas being transferred in the tube are sealed in the tube. The inner diameter of the tube 7 and the inner diameter of the tube of the reducing member of the reducing part 2 may be equal to each other or different from each other, provided that the sample can be continuously transferred.

Another reagent introducing part 5, which is for adding a reagent into a flow of the sample that has passed through the reducing part 2 and contains ammonium ions and that is being transferred in the tube 7, is provided downstream of the reducing part 2 and upstream of the gas permeation part 6. This reagent introducing part 5 includes a reagent introduction tube through which the reagent is led to the tube 7 and a reagent introduction pump which imparts a suction force to the reagent introduction tube. Examples of the reagent to be added by the reagent introducing part 5, which is provided downstream of the reducing part 2 and upstream of the gas permeation part 6, include an alkali such as sodium hydroxide as a reagent for shifting pH to an alkaline side. By adding an alkali downstream of the reducing part 2 and upstream of the gas permeation part 6, it is possible to gasify the ammonium ions in the sample into ammonia gas. Further, a buffer solution which is obtained by adding, for example, a boric acid with respect to an alkali such as sodium hydroxide may be added. The alkali is not limited to sodium hydroxide, and it is possible to select, as appropriate, a reagent which shifts the pH to the alkaline side. A reagent for preparing the buffer solution is also not limited to a boric acid, and another buffer may be selected as appropriate and added.

Figure 4:
FIG. 4 is a drawing schematically illustrating a gas permeation part of an analysis device in accordance with an embodiment of the present invention.
Figure 4:
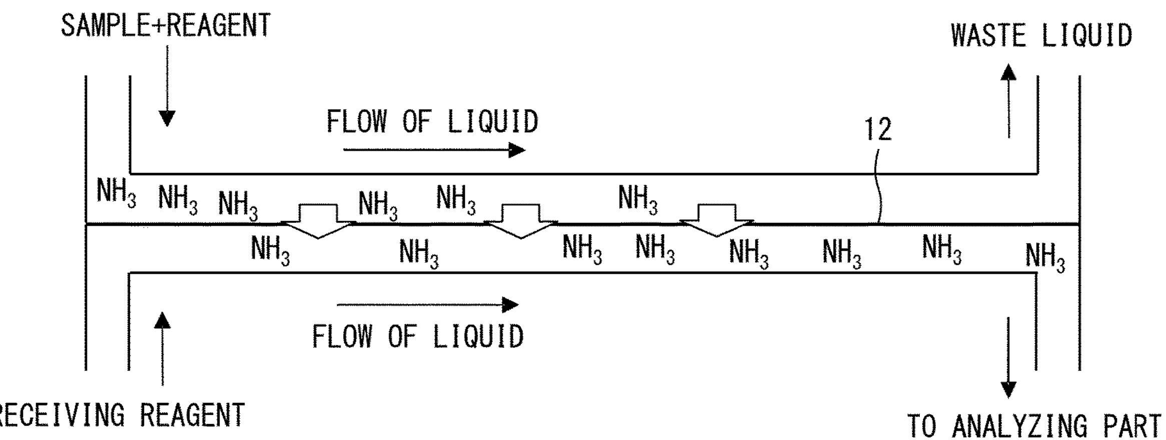

The gas permeation part 6 is a device which is for causing the ammonia gas to pass therethrough and separating the ammonia gas. FIG. 4 is a drawing schematically illustrating the gas permeation part 6. As shown in FIG. 4, when the sample which contains ammonia gas (in FIG. 4, described as "sample+reagent") is transferred into the gas permeation part 6, only the ammonia gas in the sample passes through a polytetrafluoroethylene (PTFE) porous filter 12 in the gas permeation part 6. A remaining part of the sample is discharged as waste liquid. The ammonia gas, which has passed through the PTFE porous filter 12, is absorbed by a receiving reagent and becomes ammonium ions again. The receiving reagent which has absorbed the ammonium ions is transferred in the tube 7 which is connected downstream of the gas permeation part 6, and is subjected to analysis. Note that in FIG. 4, in order to illustrate that the ammonia gas passes through the PTFE porous filter 12, the ammonia gas is indicated as $NH_3$ even after passage through the PTFE porous filter 12. However, the ammonia gas is subsequently absorbed by the receiving reagent and becomes $NH4^+$. The receiving reagent is not limited to any particular one, provided that the receiving reagent is capable of absorbing ammonia gas and converting the ammonium gas into ammonium ions. The receiving reagent can be, for example, an acid such as a sulfuric acid. The acid is not limited to a sulfuric acid, and a reagent which absorbs ammonia gas can be selected as appropriate. Further, together with the acid such as a sulfuric acid, a reagent which is used for detection of ammonium ions may be included. Examples of such a reagent include reagents used for detection of ammonium. Such a reagent is not limited to any particular one, and examples of the reagent include reagents such as Na nitroprusside which is used in indophenol blue absorptiometry. The receiving reagent may be segmented with gas bubbles and supplied. Examples of the gas used for the gas bubble segmentation can include: inert gases such as argon and helium; and various gases such as nitrogen, oxygen and air. Further, in the example illustrated in FIG. 4, the PTFE porous filter is used. However, any filter can be used provided that the filter can selectively cause ammonia gas to pass through the filter.

The ammonia gas is selectively allowed to pass and separated, by the gas permeation part 6. This makes it possible to accurately analyze the total of (i) the amount of ammonium ions in the sample that are products of reduction in the reducing part 2, in other words, the amount of nitrogen (nitrate nitrogen) of nitrate ions that have been reduced to ammonium ions and the amount of nitrogen (nitrite nitrogen) of nitrite ions that have been reduced to ammonium ions and (ii) the amount of nitrogen (ammonia nitrogen) of ammonium ions that have been contained in the original sample.

Figure 5:
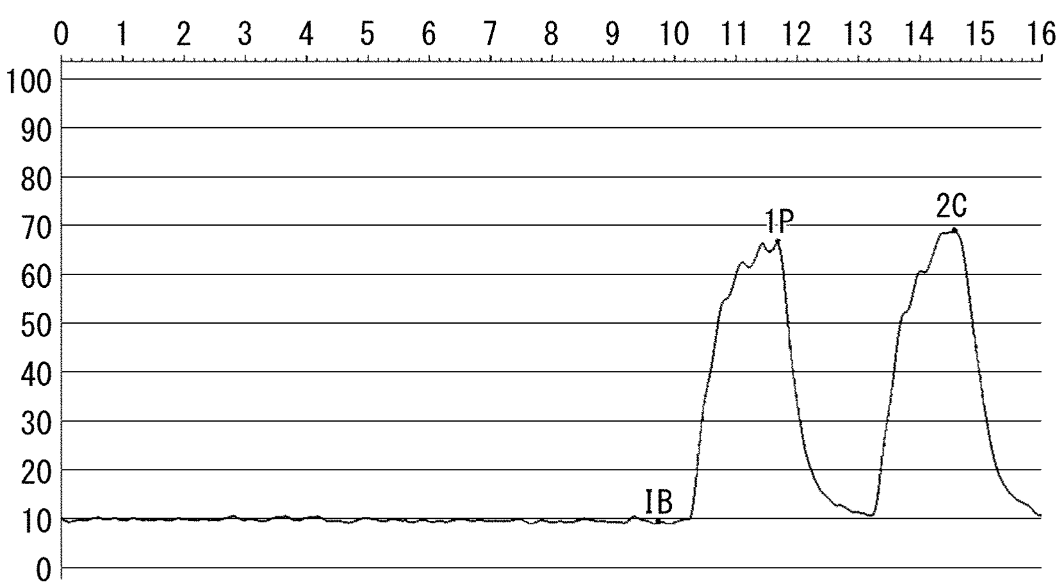
FIG. 5 is a graph showing a baseline in indophenol blue absorptiometry using a salicylic acid.
Figure 6:
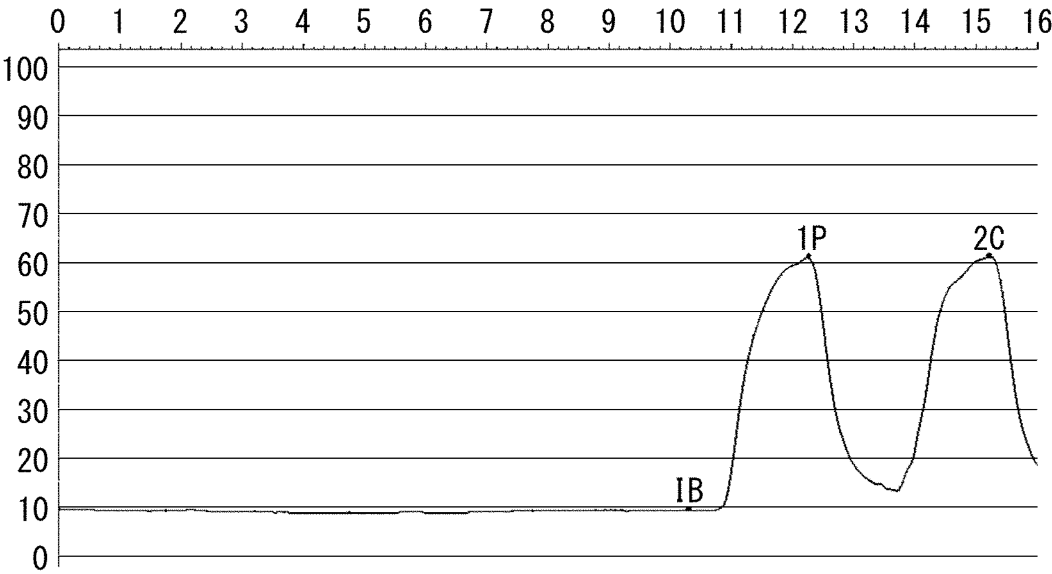
FIG. 6 is a graph showing a baseline in indophenol blue absorptiometry using a salicylic acid.

In addition, by providing the gas permeation part 6, it is possible to stabilize a baseline of a measurement chart in quantity determination of the ammonium ions by indophenol blue absorptiometry using a salicylic acid, as demonstrated in Examples described later. Compared with indophenol blue absorptiometry using phenol, the indophenol blue absorptiometry using a salicylic acid is more preferable in the following points: phenol, which is a chemical substance harmful to a human body, is not used; and no phenol is released into the environment. However, the inventors of the present invention carried out an analysis by the indophenol blue absorptiometry using a salicylic acid, with use of a device which did not include the gas permeation part 6, and as a result, found that the baseline was not stable as shown in FIG. 5. In particular, for a sample containing a trace amount of nitrate nitrogen, nitrite nitrogen, and ammonia nitrogen, it is required that the baseline is stable. In light of the above, the inventors of the present invention carried out an analysis by the indophenol blue absorptiometry using a salicylic acid, with use of a device which included the gas permeation part 6, and as a result, found that the baseline was noticeably stabilized as shown in FIG. 6. This makes it possible to carry out more accurate measurement also for a sample that contains a trace amount of nitrogen. The reason why, by using a device which included the gas permeation part 6, the baseline was noticeably stabilized here can be considered as follows: inhibitory substances, such as a metal element that is present in the sample and a metal element that has been eluted from the reducing member of the reducing part 2, are considered to cause the baseline to be unstable, and these inhibitory substances are removed by using the device which includes the gas permeation part 6.

Another reagent introducing part 5, which is for adding a reagent into a flow of the sample that has passed through the gas permeation part 6 and contains ammonium ions and that is being transferred in the tube 7, is provided downstream of the gas permeation part 6 and upstream of the analyzing part 3. This reagent introducing part 5 includes a reagent introduction tube through which the reagent is led to the tube 7 and a reagent introduction pump which imparts a suction force to the reagent introduction tube. Examples of the reagent which is added by the reagent introducing part 5 provided downstream of the gas permeation part 6 and upstream of the analyzing part 3 include, for example, reagents, such as a salicylic acid and phenol, which are used for quantity determination by indophenol blue absorptiometry of ammonium ions which have been generated by reduction of nitrate ion and nitrite ions. In the indophenol blue absorptiometry using a salicylic acid, for example, the salicylic acid and a hypochlorite such as sodium hypochlorite (NaClO) are each added as the reagent. In this case, the salicylic acid and the NaClO are preferably added separately from two different sample introducing parts. With regard to the order in which, for example, the salicylic acid and the NaClO are added, either one may be added first. However, it is preferable to add the salicylic acid and then add the NaClO. Indophenol blue absorptiometry using phenol is the same as the indophenol blue absorptiometry using a salicylic acid, except that the salicylic acid is replaced by phenol. As a reagent, for example, phenol and NaClO are added. In this case, the phenol and the NaClO are preferably added separately from two different sample introducing parts. With regard to the order in which the phenol and the NaClO are added, either one may be added first. However, it is preferable to add the phenol and then add the NaClO.

The analyzing part 3 is for analyzing the ammonium ions in the sample. In an embodiment of the present invention, in a case where the indophenol blue absorptiometry is employed as the analysis method, the analyzing part 3 is, for example, an absorptiometer. As the absorptiometer, a flow cell-type absorptiometer is more preferable. Note, however, that the analyzing part 3 is not limited to such an analyzing part 3, and it is possible to select, as appropriate, the analyzing part 3 in accordance with the analysis method employed. For example, it is possible to separate a distillate that has been obtained by reduction by the reducing part 2 and measure, by ion chromatography, a separated sample or a sample in a flow in a continuous flow analyzer. Alternatively, it is possible to make a measurement by an ion electrode method, titration, a voltammetry method, or ion chromatography. The analysis is a quantitative analysis, but may be a qualitative analysis.

In the example illustrated in FIG. 1, the flow analyzer includes reagent introducing parts 5 at three respective locations. However, the flow analyzer may include, as necessary, an additional reagent introducing part 5 in addition to the reagent introducing parts 5 described above. Reversely, the number of the reagent introducing parts may be reduced, provided that the reagent(s) can be mixed and introduced. Examples of the reagent which is introduced by the reagent introducing part 5 include, but are not limited to, acids such as nitric acid, hydrochloric acid, sulfuric acid, perchloric acid, phosphoric acid, hydrogen peroxide, and hydrofluoric acid; and alkalis such as sodium peroxide, calcium carbonate, and sodium carbonate. By adding these reagents, it is possible to adjust the pH of the sample. Further, the reagent used in the analysis is not limited to the reagents described above, and the reagent should be selected, as appropriate, in accordance with the analysis method.

In the example illustrated in FIG. 1, the flow analyzer includes the gas permeation part 6. Note, however, that the flow analyzer does not necessarily include the gas permeation part 6, and may be configured not to include the gas permeation part 6.

Although in the example illustrated in FIG. 1, a mixing coil for mixing the sample that is flowing in the tube 7 with the reagent added by the reagent introducing part 5 is not provided, the flow analyzer in accordance with an embodiment of the present invention may include the mixing coil. The mixing coil is the tube 7 which is formed in the form of a coil, and when the sample passes through the mixing coil, the reagent and the sample flowing through the tube 7 are mixed together. The shape of the mixing coil is not limited to any particular one, but can be a shape that is similar to any of shapes of reducing members illustrated in FIG. 8. The location at which the mixing coil is provided can be a location subsequent to each of the reagent introducing parts 5 or subsequent to a plurality of the reagent introducing parts 5.

Although in the example illustrated in FIG. 1, a heating bath is not provided, the flow analyzer in accordance with an embodiment of the present invention may include a heating bath which carries out a heat treatment with respect to the sample which is being transferred in the tube 7. The heating bath can be a thermostatic bath which includes a heater. Note, however, that a configuration of the heating bath is not limited to such a configuration, and the heating bath can be an ultrasonic decomposing device, a microwave, an autoclave decomposing device, or the like. In the heating bath, the tube 7 forms a coil or a helix. In an embodiment of the present invention, the heating bath is provided downstream of the reagent introducing part 5 or downstream of the mixing coil. By heating the sample to which the reagent has been added or the sample that has been mixed with the reagent, it is possible to accelerate a reaction of the sample with the reagent.

Although in the example illustrated in FIG. 1, a pool tank (reservoir) is not provided, the flow analyzer in accordance with an embodiment of the present invention may further include a pool tank in the middle of the tube 7. The flow analyzer employs a method of causing the sample to flow through an enclosed space and analyzing the sample. Therefore, there is a case where pressure increases. Even in such a case, since the flow analyzer includes the pool tank, it is possible to relieve the pressure and suitably dispense and take the sample in an amount that is necessary for each step. As a means for relieving the pressure in the flow analyzer, a debubbler, which discharges appropriate amounts of the air (gas) and the liquid, a pressure reducing valve, or the like can be, for example, provided instead of the pool tank. In a case where the flow analyzer includes the pool tank, the debubbler, the pressure reducing valve, or the like, another gas bubble segmenting part 4 which newly leads gas to the tube 7 may be provided downstream of such a means. The flow analyzer may include a plurality of pool tanks, debubblers, pressure reducing valves, or the like. Further, the flow analyzer may include a plurality of gas bubble segmenting parts 4.

The flow analyzer in accordance with an embodiment of the present invention may include a pressurizing device which applies, from downstream of the heating bath, pressure against the flow of the sample. The pressurizing device includes, for example, a compressor and a valve. By providing the pressurizing device, it is possible to accelerate the reaction in the heating bath, due to suppression of expansion of the gas bubbles in the heating bath and a synergistic effect of the heating and the pressurization. The pressure applied by the heating bath is not limited to any particular one, and is, for example, not more than 0.14 MPa.

In the flow analyzer in accordance with an embodiment of the present invention, an autosampler can be used as the sample introducing part 1. Further, an ultrasonic homogenizer or a stirrer may be provided so as to pulverize and/or stir the sample prior to the sampling.

The flow analyzer in accordance with an embodiment of the present invention may further include a diluting device which is provided in the middle of the tube 7. This makes it possible to automatically carry out desired dilution in the flow analyzer, in a case where it is necessary to dilute the sample depending on the concentration of the sample. As such a diluting device, a commercially available automatic diluting device can be suitably used.

According to the flow analyzer in accordance with an embodiment of the present invention, it is possible to determine the quantity of the total amount of dissolved nitrogen (nitrate nitrogen, nitrite nitrogen, and ammonia nitrogen) contained in the sample. Further, the flow analyzer in accordance with an embodiment of the present invention may be a device in which a preprocessing part in which the sample is processed and total nitrogen is converted to nitrate ions is incorporated in the sample introducing part 1 or may be a device in which the preprocessing part is incorporated upstream of the sample introducing part 1. The total nitrogen in the sample can be converted to nitrate ions, for example, by oxidative decomposition with potassium peroxodisulfate. By providing the preprocessing part, the total nitrogen in the sample is decomposed into nitrate ions in the preprocessing part. Thereafter, since it is possible to reduce the nitrate ions to ammonium ions and carry out quantity determination, the total nitrogen in the sample can be continuously measured. In particular, in a samples of, for example, seawater or brackish water, a copper-cadmium reduction method or the like has been employed so far because of coexisting bromide ions and salts. However, the flow analyzer in accordance with an embodiment of the present invention makes it possible to carry out continuous analysis of nitrogen and the like (nitric acid, nitrous acid, and total nitrogen) in a sample (e.g., a sample of seawater or a sample from brackish water area) without use of cadmium that causes environmental pollution, while solving the problem of column plugging. Further, by incorporating the preprocessing part in the flow analyzer in accordance with an embodiment of the present invention, it is possible to unintermittedly carry out steps from preprocessing to analysis. As such a preprocessing part, a device which fully automatically performs preprocessing is preferable. For example, a fully automatic preprocessing device which fully automatically carries out addition of a reagent, mixing, heating, and dilution in a measuring flask is suitably used. However, it is possible to have an aspect in which the preprocessing is not incorporated in the form of a preprocessing part in the flow analyzer but in which the preprocessing is separately carried out and a preprocessed sample is introduced from the sample introducing part 1.

In the flow analyzer in accordance with an embodiment of the present invention, a device which preprocesses a sample that is not a liquid but a solid or the like and thereby prepares a liquid sample may be incorporated in the sample introducing part 1 or provided upstream of the sample introducing part 1. The flow analyzer is a device which analyzes a liquid sample by a flow analysis method. Thus, it is not possible to measure, as it is, the sample that is not a liquid but a solid or the like. Therefore, by providing the device which proprocesses the sample that is not a liquid but a solid or the like and thereby prepares a liquid sample, it is possible to unintermittedly carry out steps from the preprocessing of the sample that is not a liquid but a solid or the like to the analysis.

<2.1> Embodiment 2

Figure 2:
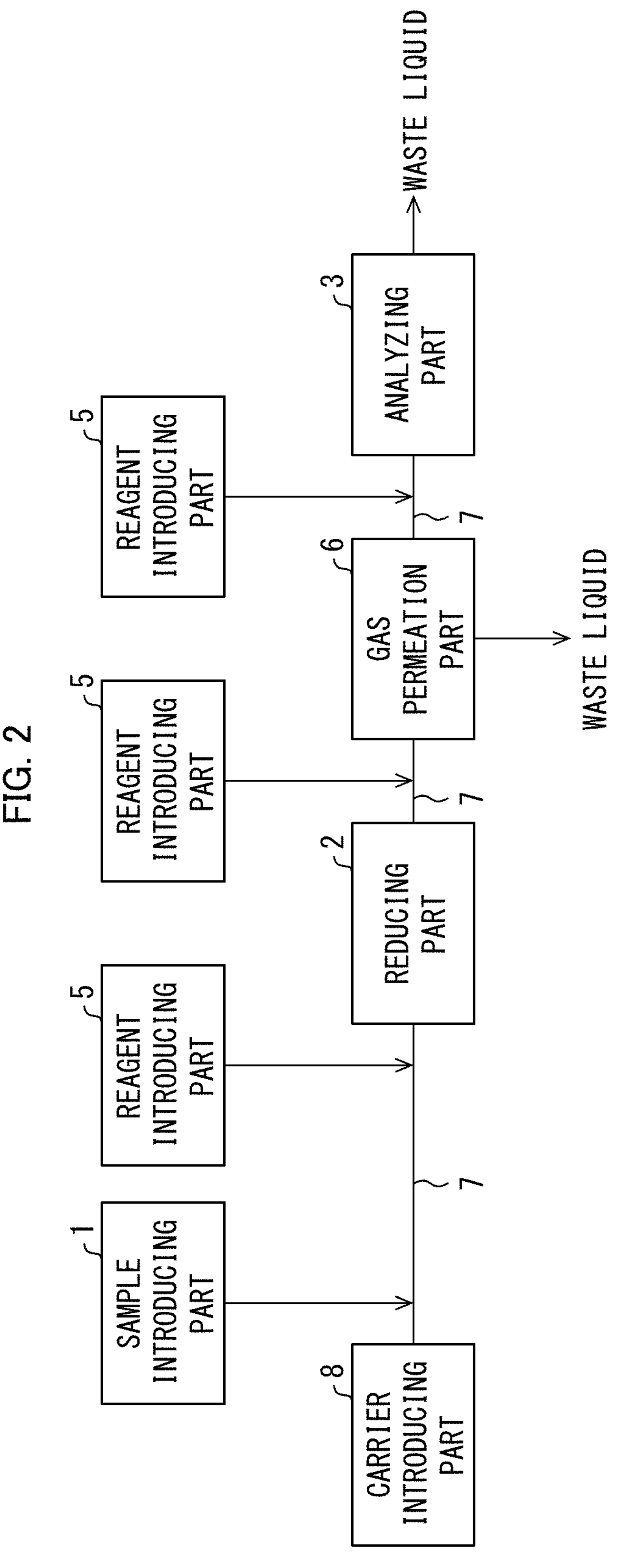
FIG. 2 is a drawing schematically illustrating a configuration of an analysis device in accordance with an embodiment of the present invention.

FIG. 2 is a drawing schematically illustrating a configuration of a flow analyzer in accordance with Embodiment 2 of the present invention. Note that, for convenience, members which have the same functions as those of the members that have been described in Embodiment 1 will be given the same reference signs and will not be described again.

A flow analyzer in accordance with Embodiment 2 of the present invention employs a flow injection analysis method (FIA) in which a reagent is introduced into a flow of a sample in a tube which sample is not segmented by gas bubbles, a reaction operation is carried out, and then an analysis is carried out with use of a detector which is provided downstream.

A flow analyzer in accordance with Embodiment 2 of the present invention, includes: a carrier introducing part 8 which is for introducing a carrier into a tube 7; a sample introducing part 1 which is for introducing a sample into a tube 7; a reagent introducing part 5 which is for adding a reagent into a flow of the sample being transferred inside the tube 7; a reducing part 2 which is for reducing, to ammonium ions, nitrate ions and nitrite ions in the sample being transferred in the tube 7; another reagent introducing part 5 which is for adding a reagent into a flow of the sample that has passed through the reducing part 2 and contains ammonium ions and that is being transferred in the tube 7; a gas permeation part 6; another reagent introducing part 5 which is for adding a reagent into a flow of the sample that has passed through the gas permeation part 6 and contains ammonium ions and that is being transferred in the tube 7; and an analyzing part 3 which is for analyzing the ammonium ions in the sample.

The flow analyzer in accordance with Embodiment 2 has the same configuration as that of the flow analyzer illustrated in FIG. 1, except that the carrier introducing part 8 is provided upstream of the sample introducing part 1 which is for introducing a sample into the tube 7 and a gas bubble segmenting part is not provided.

The flow analyzer in accordance with Embodiment 2 employs the flow injection analysis method (FIA). As such, the carrier introducing part 8 introduces a carrier into the tube 7, and the sample introducing part 1 introduces a sample into the flow of the carrier in the tube 7.

The carrier is not limited to any particular one, provided that the carrier is a liquid which does not adversely affect preprocessing and the analysis of the sample. Examples thereof include water, surfactants, acid solutions, and alkaline solutions.

The other features of the flow analyzer in accordance with Embodiment 2 are as described in Embodiment 1, and therefore description thereof will be omitted.

<3> Analysis Method

The following description will discuss an analysis method in accordance with an embodiment of the present invention. Note that, for convenience, matters which have been already described in <1> Reducing member and <2> Analysis device will not be described again.

An analysis method in accordance with an embodiment of the present invention includes: a sample introduction step of introducing a sample into a tube; a reduction step of reducing, to ammonium ions, nitrate ions and nitrite ions in the sample being transferred in the tube; and an analysis step of analyzing the ammonium ions in the sample which have been generated in the reduction step, in the reduction step, the nitrate ions and the nitrite ions in the sample being reduced by transferring the sample in a hollow tube in which at least an inner wall surface is made of zinc.

The sample introduction step is a step of introducing the sample into the tube. For example, a sampling device samples a plurality of samples and sequentially and continuously introduces them into the tube 7 at a given flow rate.

The reduction step is a step of reducing, to ammonium ions, nitrate ions and nitrite ions in the sample being transferred in the tube. In this step, the nitrate ions and the nitrite ions in the sample are reduced by transferring the sample in a hollow tube, that is the above-described reducing member, in which at least an inner wall surface is made of zinc.

The analysis step is a step of analyzing the ammonium ions in the sample which have been generated in the reduction step. Note, here, that the analysis includes detection of the presence or absence of an analysis target or measurement of the concentration of the analysis target. Note also that the analysis is not limited to a quantitative analysis or a qualitative analysis. Note also that an analysis method is not limited to any particular one, and any analysis can be employed.

Examples thereof include indophenol blue absorptiometry using a salicylic acid, indophenol blue absorptiometry using phenol, ion chromatography, an ion electrode method, titration, and voltammetry.

[Recapitulation]

Embodiments of the present invention include the following features.

<1> A reducing member being a hollow tube in which at least an inner wall surface is made of zinc and in which a sample is transferred.

<2> An analysis device including: a sample introducing part which is for introducing a sample into a tube; a reducing part which is for reducing, to ammonium ions, nitrate ions and nitrite ions in the sample being transferred in the tube; and an analyzing part which is for analyzing the ammonium ions in the sample, the ammonium ions having been generated in the reducing part, the reducing part including a reducing member recited in <1>.

<3> The analysis device as set forth in <2>, wherein the hollow tube in which at least the inner wall surface is made of zinc is helix-shaped or figure-eight helix-shaped.

<4> The analysis device as set forth in <2> or <3>, wherein at least an inner side of the hollow tube is coated with copper.

<5> The analysis device as set forth in any one of <2> to <4>, being a flow analyzer.

<6> The analysis device as set forth in any one of <2> to <5>, further including a gas bubble segmenting part which is for producing, in the tube, a plurality of segments that are separated by gas bubbles, by carrying out gas bubble segmentation with respect to the sample that has been introduced into the tube.

<7> The analysis device as set forth in <6>, wherein the gas bubble is nitrogen, argon, or helium gas bubbles.

<8> The analysis device as set forth in any one of <2> to <7>, further including a reagent introducing part that is for introducing a reagent for subjecting, to quantity determination which is carried out by indophenol blue absorptiometry using a salicylic acid, the ammonium ions which have been generated in the reducing part.

<9> The analysis device as set forth in any one of <2> to <8>, further including a gas permeation part which is for gasifying and separating the ammonium ions which have been generated in the reducing part.

<10> The analysis device as set forth in any one of <2> to <9>, further including a preprocessing part in which total nitrogen is converted to nitrate ions.

<11> An analysis method including: a sample introduction step of introducing a sample into a tube; a reduction step of reducing, to ammonium ions, nitrate ions and nitrite ions in the sample being transferred in the tube; and an analysis step of analyzing the ammonium ions in the sample which have been generated in the reduction step, in the reduction step, the nitrate ions and the nitrite ions in the sample being reduced by transferring the sample in a hollow tube in which at least an inner wall surface is made of zinc.

EXAMPLES

The present invention will be described in more detail with reference to examples below. Note, however, that the present invention is not limited to the examples, and the present invention also encompasses, in its scope, any example derived by combining, as appropriate, technical means disclosed in differing examples.

[Reagents]

The following lists reagents used in Examples.

(1) EDTA Reagent

In approximately 600 mL of pure water, 7.5 g of ethylenediaminetetraacetic acid disodium salt (EDTA-2Na) was added and dissolved. Further, 80 g/L of a sodium hydroxide solution was added, so that a resultant solution had a pH of 11. To the resultant solution, pure water was added, so that the volume was set to 1000 mL.

(2) Boric Acid Reagent

In pure water, 30 g of boric acid and 30 g of sodium hydroxide were dissolved and the volume was set to 1000 mL.

(3) Na Nitroprusside Reagent

To approximately 800 mL of pure water, 0.1 g of sodium nitrosylpentacyanoferrate (III) dihydrate was added and dissolved. To a resultant solution, 1.0 mL of a sulfuric acid was added. Then, pure water was further added, so that the volume was set to 1000 mL.

(4) Salicylic Acid Reagent

To approximately 300 mL of pure water, 50 g of sodium salicylate, 30 g of boric acid, 30 g of sodium hydroxide, and 10 g of a potassium sodium tartrate tetrahydrate were dissolved. Thereafter, pure water was further added, so that the volume was set to 500 mL.

(5) NaClO

A commercial product of approximately 10% available chlorine was 50-fold diluted and used.

[Device]

Figure 3:
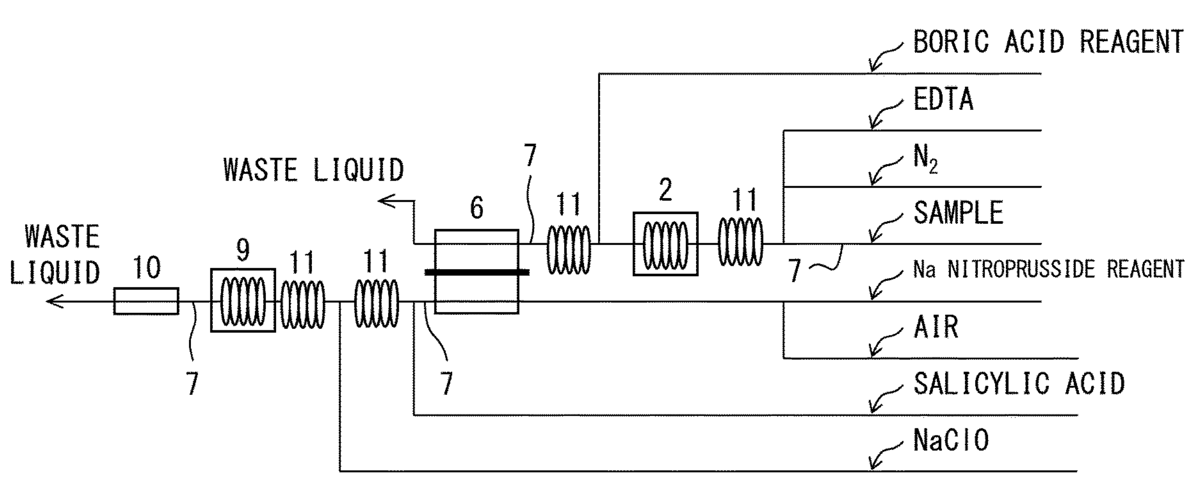
FIG. 3 is a drawing schematically illustrating a configuration of an analysis device in accordance with an embodiment of the present invention.

A flow analyzer (CFA) illustrated in FIG. 3 was used. The flow analyzer was a device which included: a sample introducing part which was for introducing a sample into a tube 7; a gas bubble segmenting part which was for carrying out gas bubble segmentation with nitrogen with respect to the sample that had been introduced into the tube 7; a reagent introducing part which was for adding an EDTA reagent into a flow of the sample being transferred inside the tube 7; a mixing coil 11 which was for mixing, with the sample, the EDTA reagent added above, in each of segments which had been obtained by segmentation with nitrogen gas bubbles; a reducing part 2 which was for reducing, to ammonium ions, nitrate ions and nitrite ions in the sample being transferred in the tube 7; another reagent introducing part which was for adding a boric acid reagent (a buffer solution obtained by adding sodium hydroxide to boric acid) into a flow of the sample that, having passed through the reducing part 2, was being transferred inside the tube 7 and that contained the ammonium ions; a mixing coil 11 which was for mixing the boric acid reagent with the sample, in each of the segments which had been obtained by the segmentation with the nitrogen gas bubbles; a gas permeation part 6 which was for allowing passage of ammonia gas that had been generated by addition of the boric acid reagent, and causing the ammonia gas having been subjected to permeation to be absorbed by the Na nitroprusside reagent (solution containing sulfuric acid and Na nitroprusside) segmented with air; another reagent introducing part which was for adding a salicylic acid reagent into a flow of the Na nitroprusside reagent that had absorbed the ammonia gas; another mixing coil 11 which was for mixing the salicylic acid reagent with the sample, in each of the segments which had been obtained by the segmentation with air; another reagent introducing part which was for further adding NaClO to the sample being transferred in the tube 7; another mixing coil 11 which was for mixing the sample and the NaClO together, in each of the segments which had been obtained by the segmentation with air; a heating bath 9 which was for reacting the ammonium ions, the salicylic acid, and the NaClO together in the sample; and an analyzing part which was for analyzing the ammonium ions in the sample. As the analyzing part, a flow cell-type absorptiometer (SCIC3000, manufactured by BL TEC K. K.) was used. A flow cell 10 had a cell length of 50 mm and measurement was carried out at a wavelength of 660 nm.

The heating bath 9 had a mixing coil placed in a heating bath, and the temperature inside the heating bath 9 was set to 45° C.

Further, as the reducing member of the reducing part 2, a hollow zinc tube, an inner side of which had been coated with copper, was used. Used as the hollow zinc tube was a coil obtained by winding, in a helix shape, a tube having a length of 300 mm, an inner diameter of 1 mm, and an outer diameter of 1.5 mm. A coating of the copper had a thickness of 10 μm to 20 μm. Further, the coil had a diameter (an outer diameter) of 30 mm.

Example 1: Measurement of Standard Solution

Figure 7:
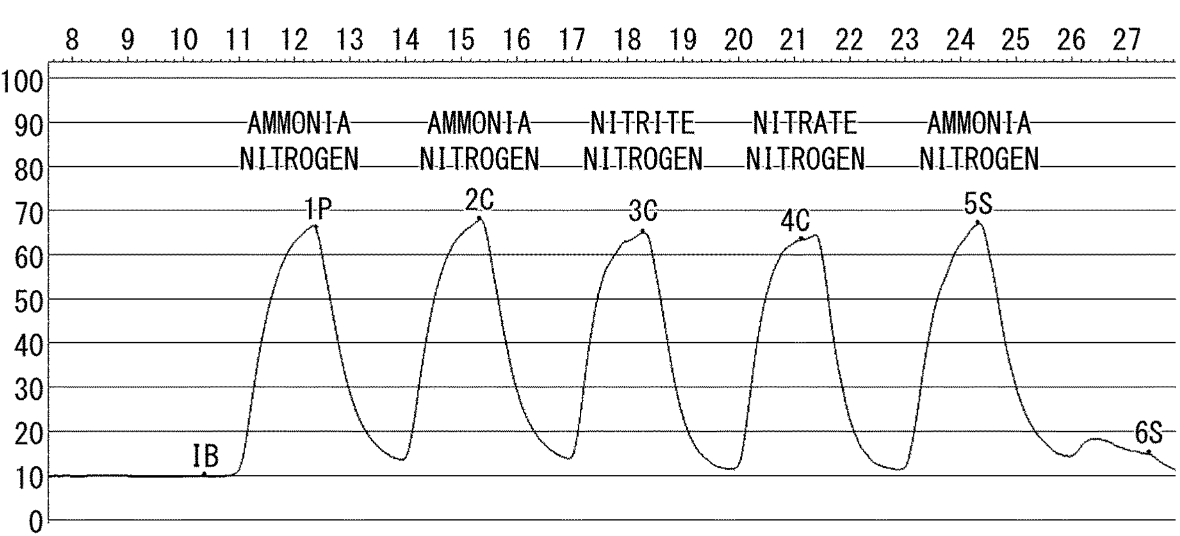
FIG. 7 is a graph showing a result of carrying out flow analysis in Examples.

Ammonia nitrogen (ammonium ions), nitrate nitrogen (nitrate ions), and nitrite nitrogen (nitrite ions) were continuously introduced into the flow analyzer in the order of ammonia nitrogen, ammonia nitrogen, nitrite nitrogen, nitrate nitrogen, and ammonia nitrogen so that concentration in terms of nitrogen of each of the ammonia nitrogen, the nitrate nitrogen and the nitrite nitrogen was 0.25 mg/L. FIG. 7 shows results of this measurement.

As shown in FIG. 7, even when the nitrite nitrogen and the nitrate nitrogen were introduced, peaks similar to those obtained in cases where the ammonia nitrogen was introduced could be obtained. It is clear from this result that 100% of each of both the nitrate nitrogen (nitrate ions) and the nitrite nitrogen (nitrite ions) was reduced to ammonium ions and accurately measured.

Example 2: Measurement of Standard Solution

Measurement was carried out in the same manner as in Example 1, except that nitrogen used for segmentation was changed to argon. As in Example 1, peaks similar to those obtained in cases where the ammonia nitrogen was introduced could be obtained (illustration of this result is omitted) even when the nitrite nitrogen and the nitrate nitrogen were introduced.

Example 3: Measurement of Standard Solution

Measurement was carried out in the same manner as in Example 1, except that nitrogen used for segmentation was changed to helium. As in Example 1, peaks similar to those obtained in cases where the ammonia nitrogen was introduced could be obtained (illustration of this result is omitted) even when the nitrite nitrogen and the nitrate nitrogen were introduced.

Example 4: Measurement Using Device which does not Include Gas Permeation Part 6

Measurement was carried out in the same manner as in Example 1, except that the gas permeation part 6 was not provided and with respect to a sample reduced in the reducing part 2, a reagent was added through the reagent introducing part which was for adding a salicylic acid reagent. FIG. 5 is a graph showing a baseline of a measurement chart obtained. Meanwhile, FIG. 6 shows a baseline of a measurement chart in Example 1. In a case where an analysis was carried out by indophenol blue absorptiometry using a salicylic acid with use of a device that does not include the gas permeation part 6, the baseline was not stable as shown in FIG. 5. In contrast, in the case of Example 1 in which an analysis was carried out by the indophenol blue absorptiometry using a salicylic acid with use of a device which included the gas permeation part 6, the baseline was found to be stable as shown in FIG. 6.

Example 5: Spike and Recovery Test

Ammonia nitrogen, nitrite nitrogen, and nitrate nitrogen were each added to a 3 wt % sodium chloride solution so that the concentration of each of the ammonia nitrogen, the nitrite nitrogen, and the nitrate nitrogen was 0.1 mg/L, and a spike and recovery test was carried out.

In each of the cases of the ammonia nitrogen, the nitrate nitrogen, and the nitrite nitrogen, it was possible to obtain a recovery rate of approximately 100%. It was clear from this result that it is possible to analyze ammonia nitrogen, nitrite nitrogen, and nitrate nitrogen in a sample containing sodium chloride.

Example 6: Spike and Recovery Test

Ammonia nitrogen, nitrite nitrogen, and nitrate nitrogen were added to seawater on the coast of Tottori Prefecture so that the concentration of each of the ammonia nitrogen, the nitrate nitrogen, and the nitrite nitrogen became 0.1 mg/L, and a spike and recovery was carried out. Since the seawater contained nitrogen, the value of the seawater to which none of ammonia nitrogen, nitrite nitrogen, and nitrate nitrogen was added was used as a blank value, and results were calculated by subtracting the blank value.

In each of the cases of the ammonia nitrogen, the nitrate nitrogen, and the nitrite nitrogen, it was possible to obtain a recovery rate of approximately 100%. It was clear from the above results that it is possible to analyze ammonia nitrogen, nitrite nitrogen, and nitrate nitrogen in seawater.

Example 7: Rate of Reduction in Continuous Measurement

A nitrate nitrogen standard solution was added to seawater and adjusted so that the concentration of nitrate nitrogen became 5 mg/L. A sample which had been prepared in this manner was introduced into the tube through the sample introducing part 60 times in series, and measurement was carried out.

Thereafter, nitrate nitrogen (nitrate ions) and nitrite nitrogen (nitrite ions) were each continuously introduced into the flow analyzer so that the concentration in terms of nitrogen of each of the nitrate nitrogen and the nitrite nitrogen became 0.25 mg/L, and flow analysis was carried out. From results thus obtained, rates of reduction of the nitrate ions and the nitrite ions were calculated. Even after carrying out measurement 60 times, the rates of reduction of the nitrate ions and the nitrite ions were approximately 100%.

INDUSTRIAL APPLICABILITY

An embodiment of the present invention can provide an analysis device and an analysis method each of which, while solving the problem of column plugging, can carry out continuous analysis of nitrogen and the like (nitric acid, nitrous acid, and total nitrogen) in a sample (e.g., a sample of seawater or a sample from brackish water area) without use of cadmium that causes environmental pollution.

Such a configuration makes it possible to reduce an environmental load. This can contribute to achieve Goals 14 and 15 of the Sustainable Development Goals.

REFERENCE SIGNS LIST

1 sample introducing part
2 reducing part
3 analyzing part
4 gas bubble segmenting part
5 reagent introducing part
6 gas permeation part
7 tube
8 carrier introducing part
9 heating bath
10 flow cell
11 mixing coil
12 PTFE porous filter The imvention claimed is:

1. A reducing member comprising a hollow tube in which at least an inner wall surface is consisting of zinc and in which a sample is transferred, wherein the hollow tube has a helix shape or a figure-eight helix shape, and
- the hollow tube has an inner diameter of 0.5 mm to 1.5 mm,
- the hollow tube has a coating consisting of copper on the inner wall surface consisting of zinc.

2. An analysis device comprising:
- a sample introducing part which is for introducing a sample into a tube;
- a reducing part which is for reducing, to ammonium ions, nitrate ions and nitrite ions in the sample being transferred in the tube; and
- an analyzing part which is for analyzing the ammonium ions in the sample, the ammonium ions having been generated in the reducing part,
- the reducing part including the reducing member recited in claim 1.

3. The analysis device as set forth in claim 2, the analysis device being a flow analyzer.

4. The analysis device as set forth in claim 2, further comprising a gas bubble segmenting part which is for producing, in the tube, a plurality of segments that are separated by gas bubbles, by carrying out gas bubble segmentation with respect to the sample that has been introduced into the tube.

5. The analysis device as set forth in claim 4, wherein the gas bubbles are nitrogen, argon, or helium gas bubbles.

6. The analysis device as set forth in claim 2, further comprising a reagent introducing part that is for introducing a reagent for subjecting, to quantity determination which is carried out by indophenol blue absorptiometry using a salicylic acid, the ammonium ions which have been generated in the reducing part.

7. The analysis device as set forth in claim 2, further comprising a gas permeation part which is for gasifying and separating the ammonium ions which have been generated in the reducing part.

8. The analysis device as set forth in claim 2, further comprising a preprocessing part in which total nitrogen in the sample is converted to the nitrate ions.

* * * * *